United States Patent Office 2,754,286
Patented July 10, 1956

2,754,286

ALDEHYDES AND THEIR ACETALS

Elmore Louis Martin, Wilmington, Del., assignor to E. I. du Pont de Nemours and Company, Wilmington, Del., a corporation of Delaware No Drawing. Application October 15, 1951,
Serial No. 251,445

10 Claims. (Cl. 260—73)

This invention relates to a new class of aldehydes and to their acetals with monohydric or polyhydric alcohols. More particularly, it relates to N-(hydroxyphenyl) carbamyl aldehydes and their acetals with monohydric and polyhydric alcohols. The invention also relates to photographic silver halide emulsions embodying such acetals and to chromogenic color development processes using the compounds.

In the color development process of color photography by the subtractive process, the couplers which produce the cyan (blue-green) dye image are usually phenols or naphthols, which are coupled with the development products of aromatic amino developing agents, according to known methods. A number of cyan color-formers have been proposed, among which the polymeric color-formers, e. g., the polyvinyl acetals of U. S. Patent 2,489,655, are particularly useful since they serve both as non-migratory color-former and as the binder for the light-sensitive silver halide. However, there is still a need for cyan color-formers having improved stability to heat and light and improved light transmission characteristics. These features are important since, in the color development process, there is usually some unused color-former left in the finished film and, if this residual color-former is not stable to heat and light, the picture will darken on further exposure to light and lose its quality. As to light transmission, it is of course important that the cyan dye absorb red and transmit blue and green light, each as completely as possible. It is also desirable that the hue of the color-developed dye be uniform at all densities. These qualities are present in an improved degree in the new acetal color-formers of this invention.

The new products of this invention are the N-(hydroxyphenyl) carbamyl aldehydes, and their acetals with monohydric and polyhydric alcohols. A group of such aldehydes has the formula:

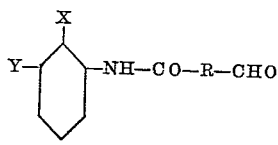

(I)

where one of the substituents X and Y is the hydroxyl (—OH) group, and the other is hydrogen, halogen, alkyl or aryl; the para position to the hydroxyl group is available for the coupling reaction; and R is a divalent organic radical which is attached to the aldehyde carbon and the carbamyl carbon by carbon atoms of which at least one is a nuclear carbon of a ring system which is aromatic in character, i. e., carbocyclic or heterocyclic, aromatic, and the other when it is not a nuclear carbon atom of the same ring system is a carbon atom of a hydrocarbon radical attached to the same ring system through carbon linkages or ether oxygen linkages. Thus R may be a phenylene, naphthalene, biphenyl, diphenyl ether, furane, thiophene, benzofurane, dibenzofurane, benzothiophene, phenoxymethylene, phenoxybimethylene, phenoxytrimethylene, etc. radical.

A class of compounds which has the structure set forth in the above Formula I but in which R is a bivalent aromatic hydrocarbon radical or nucleus has the formula:

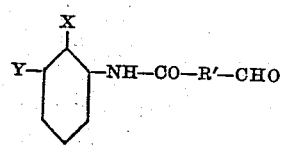

(II)

where X and Y have the same significance as in Formula I and R' is a bivalent aromatic hydrocarbon radical, e. g., o-phenylene, m-phenylene, naphthlene and biphenyl. These radicals may have one of the hydrogen atoms substituted by a chlorine or bromine atom, a nitro-group or a —COCH₃ group. In the preferred compounds X is OH and Y is hydrogen.

Another class of compounds has the formula:

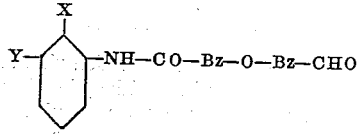

(III)

where X and Y have the same significance as in Formula I and preferably X is OH, and Y is hydrogen and Bz is a benzene nucleus which may contain the substituents of Formula II.

Another class of such compounds has the formula:

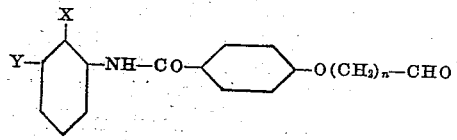

(IV)

where $n$ is an integer from 1 to 6, e. g., methylene, bimethylene, trimethylene, etc., and X and Y have the same significance as in Formula I. In the preferred compounds of this class X is OH and Y is hydrogen. The aldehydes of Formulae I, II, III and IV can be converted into acetals of monohydric and polyhydric acetals as taught herein.

The invention also includes photographic silver halide dispersions containing the acetals of the above-defined aldehydes and photographic elements bearing layers of such dispersions.

In the above formulae, as already indicated, the hydroxyl group may be in either the ortho or the meta position with respect to the carbamyl group, and the other of these two positions is either unsubstituted or substituted by a group which can be either halogen (preferably chlorine or bromine), alkyl (preferably of 1 to 6 carbon atoms), or aryl (preferably phenyl). Other substituents, for example, alkyl, aryl or halogen, can be present on the hydroxyphenyl group, but preferably no additional substituents are present. The para position with respect to the hydroxyl group should be reactive, that is, available for coupling with the development product of aromatic amino developing agents, i. e., it should not be occupied by a group which is not replaceable in the coupling reaction. In practice, this means that the para position to the hydroxyl group is either free or substituted by halogen, preferably chlorine or bromine.

The radical R may be any divalent radical containing at least one aromatic nucleus and in which at least one of the carbon atoms attached to the aldehyde carbon and the carbamyl carbon is a nuclear carbon of an aromatic ring. Preferably, R is a hydrocarbon radical or a hydrocarbon radical interrupted by an oxygen atom, i. e., containing an oxygen atom within the carbon-carbon chain, either in straight chain or ring configuration. Those compounds where R is a radical containing one or two aromatic nuclei with an ether oxygen linkage are particularly preferred because of their light stability and because they are not as susceptible to decolorization in processing as those compounds not containing such a grouping.

In the acetals of the above-defined aldehydes, the alcohol portion of the molecule, i. e., the portion acetalized with the N-(hydroxyphenyl) carbamyl aldehyde, is either a monomeric alcohol, preferably an alkanol of 1 to 4 carbon atoms, e. g., methyl, ethyl, propyl, and isobutyl alcohol, or a 1,2- or 1,3-alkanediol of 2 to 4 carbon atoms, or a polymeric alcohol. The latter is a hydroxyl polymer which is water soluble or hydrophilic in character, has a molecular weight in excess of about 10,000 and contains a large number of recurring intralinear

groups

Thus, it can be polyvinyl alcohol, or a partly hydrolyzed polyvinyl ester, e. g., polyvinyl acetate and such hydroxyl polymers which have up to 10% of the

groups acetalized with non-color-forming aldehydes, e. g. formaldehyde, acetaldehyde, n-butyraldehyde, benzaldehyde, etc., or a hydrolyzed interpolymer of vinyl esters with minor proportions of other vinyl compounds, e. g., a hydrolyzed interpolymer of vinyl acetate and ethylene. The acetals of monomeric polyhydric alcohols may be used as such in photographic emulsions or dispersions containing a water-permeable colloid binding agent for the silver halide grains, e. g., gelatin, or they may be used as intermediates in the preparation of the acetals of polymeric alcohols, the latter being used in the photographic emulsions as both the color-former and the colloid binding agent for the light-sensitive silver halide.

The color-former acetals just described may be used as a colloid to precipitate the silver halides in or they may be added to the same kind but lower substituted color-former acetal silver halide emulsion. The prepared emulsion is thus bulked-up with a higher substituted acetal. Polyvinyl alcohol can be added to the color-former acetal silver halide dispersion.

The compounds of this invention are in general prepared by the amidation of o- or m-aminophenol, or substituted aminophenols, with appropriate acyl halides. The latter are in turn prepared by a variety of methods. These methods, and the resulting aldehydes and acetals, are illustrated by the following examples, in which parts are by weight.

Example I

A. *p-Phenoxyacetophenone.*—To a solution of 170 parts of phenyl ether in 450 parts of carbon disulfide there was added 295 parts of anhydrous aluminum chloride and the resulting mixture was heated to a gentle reflux. The external heating was discontinued and 110 parts of acetic anhydride was added dropwise at such a rate as to maintain gentle reflux. As soon as the addition of the acetic anhydride had been completed, the resulting deep red solution was refluxed gently for an additional period of 30–45 minutes. The solution was poured into a mixture of excess ice and 100 parts of concentrated hydrochloric acid. The carbon disulfide was removed by steam distillation and the crude p-phenoxyacetophenone was purified by distillation. There was obtained 200 parts of p-phenoxyacetophenone boiling at 177–180° C. at 10 mm. The compound solidified on standing.

B. *p-Phenoxybenzoic acid.*—The oxidation of 106 parts of p-phenoxyacetophenone with potassium hypochlorite essentially as described in Organic Syntheses, Collective Volume II, p. 428, for the preparation of β-naphthoic acid gave 112 parts of p-phenoxybenzoic acid, M. P. 160–161° C.

C. *Methyl p-phenoxybenzoate.*—The esterification of 200 parts of p-phenoxybenzoic acid with 800 parts of methanol and 120 parts of sulfuric acid in the usual manner gave 202 parts of methyl p-phenoxybenzoate, B. P. 173–176° C. at 8 mm. The ester solidified on cooling.

D. *p - (p - Carbomethoxyphenoxy)benzyl chloride.*—Into a mechanically stirred mixture of 182 parts of methyl p-phenoxybenzoate, 30 parts of paraformaldehyde, 24 parts of anhydrous zinc chloride and 600 parts of chloroform was passed a rapid stream of dry hydrogen chloride until the reaction mixture was saturated. The flow of hydrogen chloride was then reduced and continued for two hours. The temperature was maintained at 50° C. by means of external cooling until the exothermic reaction had ceased and then at 50° C. by means of external heating. The reaction mixture was poured onto ice and dilute hydrochloric acid, the organic layer separated and was washed four times with dilute hydrochloric acid and then with dilute sodium bicarbonate solution. After drying and removal of the chloroform by distillation at reduced pressure, the residue was distilled. There was obtained 150 parts of p-(p-carbomethoxyphenoxy)benzyl chloride,

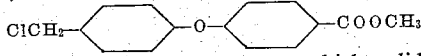

boiling at 170–185° C. at 1 mm., which solidified on cooling.

E. *p-(p-Carbomethoxyphenoxy)benzaldehyde.* — To a solution of 9.2 parts of sodium in 120 parts of methanol there was added 36 parts of 2-nitropropane followed by the addition of 110 parts of p-(p-carbomethoxyphenoxy)-benzyl chloride. The resulting solution was refluxed for one hour and then poured into water. The organic layer was separated, taken up in methylene chloride and the resulting solution was washed several times with water. After drying and removal of the solvent, the residue was distilled. There was obtained 66 parts of p-(p-carbomethoxyphenoxy)benzoaldehyde, B. P. 180–190° C. at 1 mm. Crystallization from ether gave colorless crystals melting at 59–61° C.

*Analysis.*—Calc'd for $C_{15}H_{12}O_4$: C, 70.29; H, 4.72. Found: C, 69.89; H, 5.16.

F. *p-(p-Carboxyphenoxy)benzaldehyde.*—To a suspension of 66 parts of p-(p-carbomethoxy)benzaldehyde and 20 parts of 85% potassium hydroxide in 200 parts of water there was added 100 parts of methanol and the resulting mixture was maintained at 60° C. until an homogeneous solution was obtained. The methanol was removed by distillation under reduced pressure and the resulting solution was acidified with hydrochloric acid. The precipitated p-(p-carboxyphenoxy)benzaldehyde was collected, washed with water and dried. Crystallization from methylene chloride-petroleum ether gave 40 parts of colorless crystals melting at 170–173° C.

*Analysis.*—Calc'd for $C_{14}H_{10}O_4$: C, 69.36; H, 4.16. Found: C, 69.63; H, 4.39.

G. *p-(p-Chloroformylphenoxy)benzaldehyde.*—A mixture of 24 parts of p-(p-carboxyphenoxy)benzaldehyde, 120 parts of methylene chloride and 25 parts of thionyl chloride was refluxed gently until a homogeneous solution was obtained and the evolution of hydrogen chloride and sulfur dioxide had ceased. The methylene chloride and excess thionyl chloride were removed by distillation under reduced pressure at 50° C. The residual p-(p-chloroformylphenoxy)benzaldehyde was taken up in ether and used without further purification.

H. *p - [p-(o - Hydroxyphenylcarbamyl)phenoxy]benzaldehyde.*—To a suspension of 25 parts of o-aminophenol in 200 cc. of anhydrous ether there was added, in portions, a diethyl ether solution of 25 parts of p-(p-chloroformylphenoxy)benzaldehyde, the temperature being maintained at 5–10° C. by means of external cooling.

The mixture was diluted with water and the ether was allowed to evaporate. The residue was collected, washed with water and crystallized several times from acetone-benzene. The resulting colorless crystals of p-[p-(o-hydroxyphenylcarbamyl)phenoxy]benzaldehyde melted at 190–191° C. This compound has the formula:

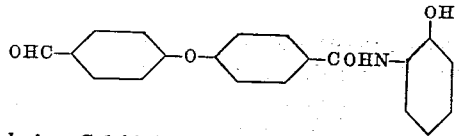

*Analysis.*—Calc'd for $C_{20}H_{15}O_4N$: C, 72.05; H, 4.54; N, 4.21. Found: C, 72.04; H, 4.59; N, 3.88.

I. *p-[p-(o - Hydroxyphenylcarbamyl)phenoxy]benzaldehyde polyvinyl mixed acetal.*—A suspension of 25 parts of p-[p-(o - hydroxyphenylcarbamyl)phenoxy]benzaldehyde, 1.5 parts of o-sulfobenzaldehyde sodium salt (added to increase the solubility of the polyvinyl acetal), 9 parts of 92% phosphoric acid and 800 parts of ethylene glycol was heated to 72° C. and stirred until a homogeneous solution was obtained. One hundred (100) parts of polyvinyl alcohol was added rapidly and the resulting reaction mixture was stirred at 70° C. for 50 minutes. The reaction mixture was cooled to 40° C. by means of external cooling and a solution of 13.5 parts of triethylamine in 300 parts of methanol was added. An additional 700 parts of methanol was added, the mixture cooled to 20° C. and filtered. The filter cake was washed with methanol and slurried for 5 minutes with 700 parts of methanol. The polyvinyl mixed acetal was collected, slurried a second time for 10 minutes with methanol, collected, slurried for 20 minutes with 700 parts of acetone, collected and dried. There was obtained 124 parts of colorless p - [p-(o-hydroxyphenylcarbamyl)phenoxy]-benzaldehyde / sodium - o - sulfobenzaldehyde polyvinyl mixed acetal that was readily soluble in aqueous ethanol.

J. *Photographic emulsion using p-[p-(o-hydroxyphenylcarbamyl)phenoxy]benzaldehyde mixed polyvinyl acetal.*—A mixture of 10 parts of p-[p-(o-hydroxyphenylcarbamyl)phenoxy]benzaldehyde/sodium - o - sulfobenzaldehyde polyvinyl mixed acetal, 40 parts of ethanol, 150 parts of water and 1 part of a 10% solution of sodium carbonate monohydrate was stirred at 70–75° C. for 10 minutes. The resulting solution was cooled to room temperature and used to prepare a photographic silver halide emulsion under such conditions as to prevent exposure or fogging of the silver salts as follows:

To 90 parts of the above solution there was added 20 parts of ethanol and to the resulting solution was added simultaneously and at essentially equivalent rates with stirring a solution of 31 parts of 3 N ammonium bromide and 2 parts of 0.5 N potassium iodine in 32 parts of water together with a solution of 29 parts of 3 N silver nitrate, 25 parts of 20% ammonium hydroxide and 7 parts of water during the course of 10 minutes. After stirring for a total of one-half hour, the emulsion was run into 250 parts of a 15% aqueous sodium sulfate solution. The precipitated silver halide-polyvinyl acetal-color-former emulsion was pressed into a thin sheet, cut into small pieces and washed for one hour in running water, after which the excess water was drained off. A mixture of 25 parts of ethanol and 25 parts of water was added and the mixture was stirred at 70–75° C. for 10 minutes. The remainder of the original polyvinyl mixed acetal solution was added and the stirring was continued for an additional period of 10 minutes. After cooling to 25° C., the emulsion was coated on film base, the resulting photographic film was exposed and then developed in a solution prepared as follows:

| | G. |
|---|---|
| p-Aminodiethylaniline hydrochloride | 2.5 |
| Sodium sulfite (anhydrous) | 10.0 |
| Sodium carbonate (monohydrate) | 30.0 |
| Potassium bromide | 2.0 |
| Water to make 1000 cc. | |

The film was fixed in 25% sodium thiosulfate, washed, bleached in 4% potassium ferricyanide, washed, fixed in 25% sodium thiosulfate and washed. The resulting film contained a bright cyan negative dye image.

*Example II*

A. *p-(p-Carbomethoxyphenoxy)benzaldehyde ethylene glycol acetal.*—A mixture of 114 parts of p-(p-carbomethoxyphenoxy)benzaldehyde, 27 parts of ethylene glycol, 0.7 part of 92% phosphoric acid and 250 parts of xylene was refluxed gently, the water of reaction being allowed to distill. After about 1 hour, the theoretical amount of water had been collected. The xylene was distilled under reduced pressure and the residue was poured into water containing 5 parts of sodium bicarbonate. The solid reaction product was collected, crystallized from methanol and the recovered colorless crystals of p-(p-carbomethoxyphenoxy)benzaldehyde ethylene glycol acetal melted at 76–78° C.

*Analysis.*—Calc'd for $C_{17}H_{16}O_5$: C, 67.98; H, 5.37. Found: C, 68.09; H, 5.64.

B. *p-(p-Carboxyphenoxy)benzaldehyde ethylene glycol acetal.*—To a solution of 60 parts of p-(p-carbomethoxyphenoxy)benzaldehyde ethylene glycol acetal in 100 cc. of methanol there was added a solution of 14 parts of potassium hydroxide in 140 parts of water. The resulting reaction mixture was stirred at 60° C. until a homogeneous solution was obtained and the methanol was distilled under reduced pressure. The resulting aqueous solution was carefully neutralized with dilute hydrochloric acid and the product was collected, washed with cold water and air-dried. After drying over phosphorus pentoxide under reduced pressure, p-(p-carboxyphenoxy)-benzaldehyde ethylene glycol acetal was obtained as colorless, glistening plates melting at 157–160° C. after crystallization from ethylene chloride.

*Analysis.*—Calc'd for $C_{16}H_{14}O_5$: C, 67.11; H, 4.93. Found: C, 67.48; H, 4.92.

C. *p-(p-Chloroformylphenoxy)benzaldehyde ethylene glycol acetal.*—A suspension of 28.6 parts of p-(p-carboxyphenoxy)benzaldehyde ethylene glycol acetal, 200 parts of methylene chloride and 20 parts of thionyl chloride was refluxed gently until a homogeneous solution was obtained and the evolution of hydrogen chloride and sulfur dioxide had essentially ceased. Removal of the methylene chloride and excess thionyl chloride under reduced pressure in a bath at 50° C. gave a solid, crystalline corresponding acid chloride which was dissolved in 75 parts of anhydrous dioxane and used without further purification.

D. *p-[p-(m - Hydroxyphenylcarbamyl)phenoxy]benzaldehyde ethylene glycol acetal.*—To a solution of 12 parts of m-aminophenol dissolved in 75 parts of dioxane there was added a solution of 30 parts of p-(p-chloroformylphenoxy)benzaldehyde ethylene glycol acetal in 75 parts of dioxane in small portions, the pH of the reaction mixture being maintained at 7–9 by the addition of a 20% solution of potassium carbonate and the temperature of the mixture being kept at 5–10° C. by means of external cooling. After stirring for an additional period of ½ hour, the reaction mixture was diluted with water and the oily layer was separated. Stirring the oily product with warm water gave a crystalline product that was collected, washed with water, air-dried, and crystallized several times from aqueous methanol to yield nearly colorless crystals of p-[p-(m-hydroxyphenylcarbamyl)phenoxy]benzaldehyde ethylene glycol acetal which melted at 147–149° C. This compound has the formula:

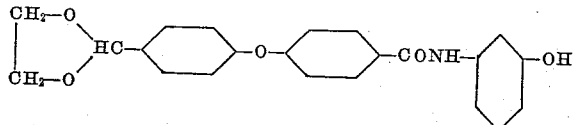

*Analysis.*—Calc'd for $C_{22}H_{19}O_5N$: C, 69.99; H, 5.08; N, 3.71. Found: C, 70.02; H, 4.89; N, 3.92.

E. *p-[p-(m-Hydroxyphenylcarbamyl)phenoxy]benzaldehyde polyvinyl mixed acetal.*—A mixture of 1.2 parts p-[p-(m-hydroxyphenylcarbamyl)phenoxy]benzaldehyde/ethylene glycol acetal, 35 parts of ethylene glycol, 0.08 part of o-sulfobenzaldehyde sodium salt and 0.4 part of 92% phosphoric acid was stirred with warming until a homogeneous solution was obtained. The solution was cooled to 60° C. and 5 parts of polyvinyl alcohol was added rapidly. The resulting reaction mixture was stirred at 70° C. for 40 minutes and the p-[p-(m-hydroxyphenylcarbamyl)phenoxy]benzaldehyde / sodium-o-sulfobenzaldehyde polyvinyl mixed acetal was isolated essentially as described in Example I, Section I.

F. *Photographic emulsion using p-[p-(m-hydroxyphenylcarbamyl)phenoxy]benzaldehyde polyvinyl mixed acetal.*—One hundred (100) parts of a 5% solution of p-[p-(m-hydroxyphenylcarbamyl)phenoxy]benzaldehyde/sodium-o-sulfobenzaldehyde polyvinyl acetal was prepared essentially as described in Example I, Section J. A silver halide emulsion utilizing this solution was prepared, coagulated, washed, redispersed and coated on film base essentially as described in Example I, Section J. The processed film gave a strong cyan negative dye image.

*Example III*

A. *p-(p-Carbomethoxy-o-nitrophenoxy)benzaldehyde.*—A mixture of 98 parts of p-hydroxybenzaldehyde, 42 parts of sodium methylate, 160 parts of methyl 3-nitro-4-chlorobenzoate and 320 parts of methanol was refluxed with stirring for 24 hours. The reaction mixture was diluted with water and the resulting oil was stirred with a small volume of methanol whereupon crystals separated. Two crystallizations from methanol gave 200 parts of faintly yellow crystals of p-(p-carbomethoxy-o-nitrophenoxy)benzaldehyde,

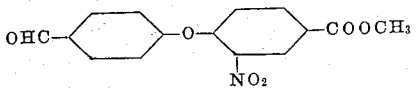

melting at 103–105° C.

*Analysis.*—Calc'd for $C_{15}H_{11}O_6N$: C, 59.78; H, 3.68; N, 4.65. Found: C, 60.05; H, 4.10; N, 4.63.

B. *p-(p-Carboxy-o-nitrophenoxy)benzaldehyde.*—To a solution of 65 parts of p-(p-carbomethoxy-o-nitrophenoxy)benzaldehyde in 240 parts of ethanol there was added a solution of 16 parts of sodium hydroxide in 100 parts of water. The mixture was warmed for a few minutes until a test portion remained clear on dilution with water. The main reaction mixture was diluted with 1000 parts of water and acidified by means of hydrochloric acid. The p-(p-carboxy-o-nitrophenoxy)benzaldehyde was collected, washed with water and crystallized from ethanol-water. There was obtained 96 parts of faintly yellow crystals of p-(p-carboxy-o-nitrophenoxy)benzaldehyde, M. P. 188–189° C. The neutralization equivalent was 284.9 whereas the calculated value is 287.1.

*Analysis.*—Calc'd for $C_{14}H_9O_6N$: C, 58.52; H, 3.16; N, 4.99. Found: C, 58.60; H, 3.39; N, 5.02.

C. *p-[p-(o-Hydroxyphenylcarbamyl)-o-nitrophenoxy]benzaldehyde dimethyl acetal.*—A suspension of 28.7 parts of p-(p-carboxy-o-nitrophenoxy)benzaldehyde, 25 parts of thionyl chloride, 400 parts of methylene chloride and 0.2 part of pyridine was refluxed until a homogeneous solution was obtained (3 hours). The methylene chloride and excess thionyl chloride were removed under reduced pressure. The residue was taken up in methylene chloride and was added to a suspension of 25 parts of o-aminophenol in 300 parts of methylene chloride. The methylene chloride was removed by distillation, water was added to the residue and the solid material was collected, washed with water and crystallized four times from acetone-methanol to give 19.7 parts of faintly yellow crystals melting at 190–192° C. with decomposition. Analysis indicated that the dimethyl acetal was formed during the purification which has the formula:

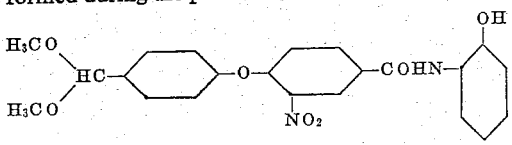

*Analysis.*—Calc'd for $C_{22}H_{20}O_7N_2$: C, 62.24; H, 4.75; N, 6.60. Found: C, 62.30; H, 4.87; N, 6.20.

D. *p-[p-(Hydroxyphenylcarbamyl)-o-nitrophenoxy]benzaldehyde polyvinyl acetal.*—A mixture of 10 parts of polyvinyl alcohol, 2.6 parts of p-[p-(o-hydroxyphenylcarbamyl)-o-nitrophenoxy]benzaldehyde dimethyl acetal, 0.1 part of o-sulfobenzaldehyde sodium salt, 65 parts of ethylene glycol and 0.8 part of 92% phosphoric acid was stirred at 70° C. for 75 minutes. The p-[p-(o-hydroxyphenylcarbamyl)-o-nitrophenoxy]benzaldehyde / sodium - o - sulfobenzaldehyde polyvinyl mixed acetal was isolated essentially as described in Example I, Section I.

E. *Photographic emulsion using p-[p-(o-hydroxyphenylcarbamyl)-o-nitrophenoxy]benzaldehyde polyvinyl mixed acetal.*—Two hundred (200) parts of a 5% solution of p-[p-(o-hydroxyphenylcarbamyl)-o-nitrophenoxy]benzaldehyde/sodium polyvinyl acetal was prepared essentially as described in Example I, Section J. A silver halide emulsion was prepared, coagulated, washed, redispersed and coated on film base essentially as described in Example I, Section J. The processed film gave a strong cyan negative dye image.

*Example IV*

A. *p-Chloroformylbenzaldehyde diacetate.*—A mixture of 285 parts of acetic acid, 285 parts of acetic anhydride and 80 parts of concentrated sulfuric acid was cooled to 5° C. and 28 parts of p-toluyl chloride (prepared from p-toluic acid and excess thionyl chloride) was added. To the resulting solution there was added 50 parts of chromium trioxide in small portions, the temperature being maintained at 5–10° C. by means of external cooling. The reaction mixture was poured into excess ice, the mixture filtered and the filter cake washed with cold water until the filtrate was colorless. The crude p-chloroformylbenzaldehyde diacetate was taken up in methylene chloride, the solution was dried and concentrated to a small volume. The addition of a small amount of petroleum ether gave colorless crystals of p-chloroformylbenzaldehyde diacetate,

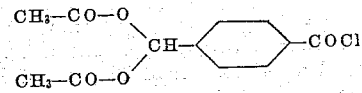

B. *p-(o-Hydroxyphenylcarbamyl)benzaldehyde diacetate.*—To the methylene chloride solution of the p-chloroformylbenzaldehyde diacetate, prepared as described in Section A, was added 42 parts of o-aminophenol. The reaction mixture was concentrated to a thick paste by partial evaporation of the methylene chloride under reduced pressure, water was added and the removal of the methylene chloride was completed. The solid material was collected, washed with dilute hydrochloric acid and crystallized repeatedly from acetone-water. The resulting colorless crystals of p-(o-hydroxyphenylcarbamyl)benzaldehyde diacetate melted at 155–157° C. The compound has the formula:

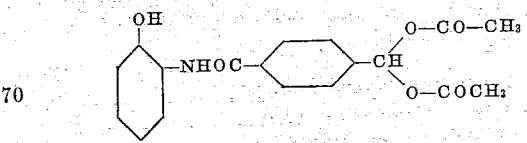

*Analysis.*—Calc'd for $C_{18}H_{17}O_6N$: C, 62.95; H, 5.00; N, 4.08. Found: C, 63.01; H, 5.23; N, 4.18.

C. *p-(o-Hydroxyphenylcarbamyl)benzaldehyde poly-* vinyl acetal.—A mixture of 10 parts of polyvinyl alcohol, 2 parts of p-(o-hydroxyphenylcarbamyl)benzaldehyde diacetate, 70 parts of ethylene glycol and 0.25 part of p-toluene-sulfonic acid monohydrate was stirred at 73–75° C. for 2 hours. The p-(o-hydroxyphenylcarbamyl)benzaldehyde polyvinyl acetal was isolated essentially as described in Example I, Section I.

D. *Photographic emulsion using p-(o-hydroxyphenylcarbamyl)benzaldehyde polyvinyl acetal.*—Two hundred (200) parts of a 5% solution of p-(o-hydroxyphenylcarbamyl)benzaldehyde polyvinyl acetal was prepared essentially as described in Example I, Section J. A silver halide emulsion utilizing this solution was prepared, coagulated, washed, redispersed and coated on film base essentially as described in Example I, Section J. The processed film gave a strong cyan negative dye image.

Example V

A. *p - [(o-Hydroxyphenylcarbamyl)methoxy]benzaldehyde.*—A mixture of 25 parts of p-carboxymethoxybenzaldehydem.

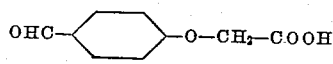

(prepared by the condensation of the sodium salt of p-hydroxybenzaldehyde and sodium chloroacetate in aqueous solution), 25 parts of thionyl chloride and 75 parts of methylene chloride was refluxed until a homogeneous solution was obtained. The methylene chloride and excess thionyl chloride were removed by distillation under reduced pressure in a bath at 58° C. The residual acid chloride was taken up in benzene and 28 parts of o-aminophenol was added. The mixture was warmed gently, water was added and the reaction mixture was filtered. The filter cake was dissolved in excess 2% potassium hydroxide solution and poured into excess dilute hydrochloric acid. The crude p-[(o-hydroxyphenylcarbamyl)-methoxy]benzaldehyde was crystallized from aqueous methanol and finally crystalized twice from acetone-benzene. The colorless crystals melted at 177–179° C. The compound has the formula:

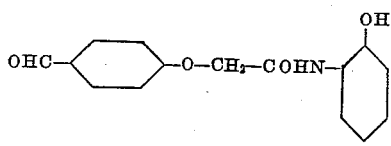

*Analysis.*—Calc'd. for $C_{15}H_{13}O_4N$: C, 66.40; H, 4.83; N, 5.17. Found: C, 66.54; H, 4.82; N, 5.18.

B. *p-[(o-Hydroxyphenylcarbamyl)methoxy]benzaldehyde/sodium-o-sulfobenzaldehyde polyvinyl mixed acetal.*—A mixture of 10 parts of polyvinyl alcohol, 2 parts of p - [(o - hydroxyphenylcarbamyl)methoxy]benzaldehyde, 0.5 part of o-sulfobenzaldehyde sodium salt, 65 parts of ethylene glycol and 0.8 part of 92% phosphoric acid was stirred at 66–67° C. for one-half hour. The above-named polyvinyl mixed acetal was isolated essentially as described in Example I, Section I.

C. *Photographic emulsion using p-[(o-hydroxyphenylcarbamyl)-methoxy]benzaldehyde polyvinyl mixed acetal.*—Two hundred (200) parts of a 5% solution of p-[(o-hydroxyphenylcarbamyl)methoxy]benzaldehyde/sodium-o-sulfobenzaldehyde polyvinyl mixed acetal was prepared essentially as described in Example I, Section J. A silver halide emulsion utilizing this solution was prepared, coagulated, washed, redispersed, and coated on film base essentially as described in Example I, Section J. The processed film gave a strong cyan negative dye image.

Example VI

A. *β-(p-Carbethoxyphenoxy)propionaldehyde ethylene glycol acetal.*—To a solution of 25 parts of sodium in 225 parts of absolute ethanol there was added 166 parts of ethyl p-hydroxy-benzoate and 136.5 parts of β-chloropropionaldehyde ethylene glycol acetal (prepared essentially as described in Organic Syntheses, Collective Volume II, page 137, from acrolein, ethylene glycol and hydrogen chloride). The resulting mixture was heated in a closed reaction vessel for 4 hours at 140–150° C. and for 4 hours at 150–160° C. After cooling, the reaction mixture was poured into water, the solid material was collected, dissolved in methylene chloride and after concentration, the residue was distilled. There was obtained 182 parts of β-(p-carbethoxyphenoxy)propionaldehyde ethylene glycol acetal,

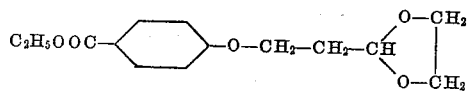

B. P. 170–175° C. at 1 mm. that solidified and melted at 46–48° C.

*Analysis.*—Calc'd. for $C_{18}H_{18}O_5$: C, 63.13; H, 6.82. Found: C, 63.35; H, 6.99.

B. *β-(p-Carboxyphenoxy)propionaldehyde ethylene glycol acetal.*—A mixture of 30 parts of β-(p-carbethoxyphenoxy)-propionaldehyde ethylene glycol acetal, 75 parts of a 10% solution of potassium hydroxide and 20 parts of ethanol was refluxed gently until a homogeneous solution was obtained. The resulting solution was poured onto ice and then solidified with dilute hydrochloric acid. The precipitated acid was collected, washed thoroughly with cold water and air dried. The yield of colorless, crystalline β-(p-carboxyphenoxy)-propionaldehyde ethylene glycol acetal, M. P. 156–157° C. was 27 parts.

C. *β-(p-Chloroformylphenoxy)propionaldehyde ethylene glycol acetal.*—A suspension of 115 parts of β-(p-carboxyphenoxy)-propionaldehyde ethylene glycol acetal in 400 parts of methylene chloride and 65 parts of thionyl chloride was refluxed with stirring until a homogeneous solution was obtained, about 4 hours being required. The methylene chloride and excess thionyl chloride were removed under reduced pressure at 40–45° C.

D. *β-[p-(o-Hydroxyphenylcarbamyl)phenoxy]propionaldehyde ethylene glycol acetal.*—To a suspension of 109 parts of o-aminophenol in 500 parts of methylene chloride was added, in small portions, a solution of 128 parts of β - (p - chloroformylphenoxy) - propionaldehyde ethylene glycol acetal in 200 parts of methylene chloride. After stirring for 15 minutes, the reaction mixture was poured into water and 100 parts of petroleum ether was added. The mixture was filtered, the filter cake was washed twice with water and then with cold diethyl ether until the filtrate was essentially colorless. The filter cake was stirred with excess, cold 2% hydrochloric acid to remove unreacted o-aminophenol, collected and washed thoroughly with water. Three crystallizations from methylene chloride-benzene gave 90 parts of β-[p-(o-hydroxyphenylcarbamyl)phenoxy]propionaldehyde ethylene glycol acetal. The colorless crystals melted at 124–126° C. The compound has the formula:

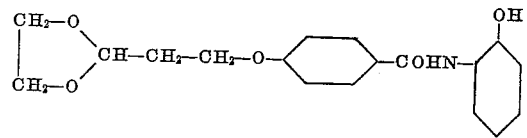

*Analysis.*—Calc'd. for $C_{18}H_{19}O_5N$: C, 65.61; H, 5.82; N, 4.26. Found: C, 65.68; H, 5.91; N, 4.18.

E. *β-[p - (o - hydroxyphenylcarbamyl)phenoxy]propionaldehyde polyvinyl mixed acetal.*—A solution of 5 parts of methanesulfonic acid in 1300 parts of ethylene glycol was heated to 75° C. and a mixture of 44 parts of β-[p-(o - hydroxyphenylcarbamyl)phenoxy]propionaldehyde ethylene glycol acetal and 1.5 parts of o-sulfobenzaldehyde sodium salt was added. To the resulting solution there was added 200 parts of polyvinyl alcohol and the mixture was stirred at 70° C. for 1.5 hours, then allowed to cool to 63° C. during the course of 0.5 hour. After cooling to 50° C. by means of external cooling, a solution of 5 parts of triethylamine in 400 parts of methanol was added and the reaction mixture was diluted with an additional 1000 parts of a mixture of equal parts of acetone and methanol. The polyvinyl acetal was collected, washed with the mixed solvents and stirred for 5- and 15-minute periods with the mixed solvents. A final slurry with acetone for 30 minutes completed the washing process. After air-drying, the colorless β-[p-(o-hydroxyphenylcarbamyl)phenoxy]propionaldehyde/sodium - o - sulfobenzaldehyde polyvinyl mixed acetal was dried to constant weight over phosphorus pentoxide under reduced pressure. The combined yield from two runs was 460 parts.

F. *Photographic emulsion using β-[p - (o - hydroxyphenyl - carbamyl)phenoxy]propionaldehyde polyvinyl mixed acetal.*—Ten (10) parts of β-[p-(o-hydroxyphenylcarbamyl)phenoxy]benzaldehyde/sodium - o - sulfobenzaldehyde polyvinyl mixed acetal was dissolved in a mixture of 40 parts of absolute ethanol, 1 part of a 10% solution of sodium carbonate monohydrate and 160 parts of water at 70–75° C. essentially as described in Example I, Section J. A silver halide emulsion utilizing this solution was prepared, coagulated, washed, redispersed, and coated on film base essentially as described in Example I, Section J. The exposed film gave a strong cyan negative dye image when processed essentially as described in Example I, Section J.

Example VII

A. *β-[p-(o-hydroxy - m - chlorophenylcarbamyl)phenoxy]propionaldehyde ethylene glycol acetal.*—A solution of 26 parts of β-(p-chloroformylphenoxy)propionaldehyde ethylene glycol acetal in 150 parts of methylene chloride was added to a suspension of 32 parts of 2-amino-6-chlorophenol (prepared as described in British Patent 562,205) in 100 parts of methylene chloride. The product was isolated essentially as described in Example VI, Section D. The β-[p-(o-hydroxy-m-chlorophenylcarbamyl)phenoxy]propionaldehyde ethylene glycol acetal was obtained as colorless crystals melting at 118–121° C. after crystallization from methylene chloride-ether mixture. The compound has the formula:

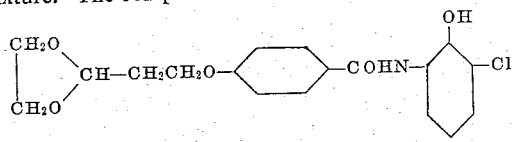

B. *β-[p-(o-hydroxy - m - chlorophenylcarbamyl)phenoxy]propionaldehyde polyvinyl acetal.*—A mixture of 10 parts of polyvinyl alcohol, 3 parts of β-[p-(o-hydroxy-m-chlorophenylcarbamyl)phenoxy]propionaldehyde ethylene glycol acetal, 0.25 part of p-toluenesulfonic acid monohydrate and 65 parts of ethylene glycol was stirred at 75° C. for 5.5 hours. The β-[p-(o-hydroxy-m-chlorophenylcarbamyl)phenoxy]propionaldehyde polyvinyl acetal was isolated essentially as described in Example VI, Section E.

C. *Photographic emulsion using β-[p-(o-hydroxy-m-chlorophenylcarbamyl)phenoxy]propionaldehyde polyvinyl acetal.*—Two hundred (200) parts of a 5% solution of β - [p-(o-hydroxy-m-chlorophenylcarbamyl)phenoxy]propionaldehyde polyvinyl acetal was prepared essentially as described in Example I, Section J. A silver halide emulsion utilizing this solution was prepared, coagulated, washed, redispersed, and cooled on film base essentially as described in Example I, Section J. The processed film gave a strong cyan negative dye image.

Example VIII

A. *β-[p - (m - phenyl-o-hydroxyphenylcarbamyl)phenoxy]propionaldehyde ethylene glycol acetal.*—A solution of 26 parts of β-(p-chloroformyl-phenoxy)propionaldehyde ethylene glycol acetal in 30 parts of methylene chloride was added to a solution of 37 parts of 2-amino-6-phenylphenol (prepared by the acid hydrolysis of 2-methyl-7-phenylbenzoxazole, B. P. 150–160° C. at 2 mm. that was obtained by the zinc dust-acetic anhydride reduction of the two isomeric nitrophenols obtained by the nitration of o-hydroxydiphenyl in acetic acid with nitric acid) in 150 parts of methylene chloride. The 2-amino-6-phenyl-phenol hydrochloride was filtered and the filtrate was evaporated to a small volume. The residual thick oil was taken up in 10% potassium hydroxide solution and the solution was acidified with acetic acid. Crystallization of the crude β-[p-(m-phenyl-o-hydroxyphenylcarbamyl)phenoxy]propionaldehyde ethylene glycol acetal from methylene chloride-ether mixture gave low melting, colorless crystals. The compound has the formula:

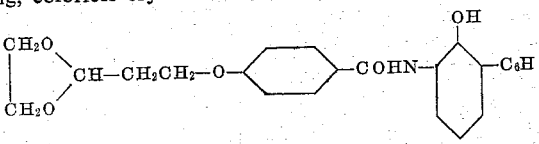

B. *β-[p - (m - phenyl-o-hydroxyphenylcarbamyl)phenoxy]propionaldehyde polyvinyl acetal.*—A mixture of 10 parts of polyvinyl alcohol, 0.25 part of p-toluenesulfonic acid monohydrate, 3 parts of β-[p-(m-phenyl-o-hydroxyphenylcarbamyl)phenoxy]propionaldehyde ethylene glycol acetal and 65 parts of ethylene glycol was stirred at 75–77° C. for 4 hours. The β-[p-(m-phenyl-o-hydroxyphenylcarbamyl)phenoxy]propionaldehyde polyvinyl acetal was isolated essentially as described in Example VI, Section E.

C. *Photographic emulsion using β-[p-(m - phenyl - o-hydroxyphenylcarbamyl)phenoxy]propionaldehyde polyvinyl acetal.*—Ten (10) parts of β-[p-(m-phenyl-o-hydroxyphenylcarbamyl)phenoxy]propionaldehyde polyvinyl acetal was dissolved in a mixture of 40 parts of absolute ethanol, 150 parts of water and 1 part of a 10% solution of sodium carbonate monohydrate essentially as described in Example I, Section J. A silver halide emulsion utilizing this solution was prepared, coagulated, washed, redispersed, and coated on film base essentially as described in Example I, Section J. A strong cyan dye image was obtained on processing a piece of the exposed film essentially as described in Example I, Section J.

Example IX

A. *Methyl 5 - chloromethylbenzofuran - 2 - carboxylate.*—Through a stirred mixture of 106 parts of methyl benzofuran-2-carboxylate, B. P. 120–125° C. at 1 mm., prepared by the esterification with methanol and sulfuric acid of benzofuran-2-carboxylic acid (coumarilic acid; see "Organic Syntheses," vol. 24, p. 33, for the preparation of coumarilic acid), 22 parts of paraformaldehyde, 20 parts of anhydrous zinc chloride, and 325 parts of chloroform there was passed rapidly dry hydrogen chloride. The temperature was allowed to increase to 50° C. and maintained at this point for one hour after the exothermic reaction had ceased. The two layers were separated, the organic layer was washed with five changes of water, dried and concentrated. Distillation of the residue gave 105 parts of methyl 5-chloromethylbenzofuran-2-carboxylate,

boiling at 160–170° C., mainly 165° C., at 1 mm. pressure.

B. *2-carbomethoxy-5-benzofuraldehyde.*—To a solution of 22 parts of sodium in 300 parts of methanol there was added 83 parts of 2-nitropropane, followed by the addition of a solution of 204 parts of methyl 5-chloromethylbenzofuran-2-carboxylate in 200 parts of methanol. The resulting mixture was refluxed for 2 hours and the methanol was removed by distillation. Working up the residue gave 126 parts of 2-carbomethoxy-5-benzofuraldehyde boiling at 165–170° C. at 1 mm. pressure.

C. *2-carboxy-5-benzofuraldehyde.*—To a solution of 88 parts of 2-carbomethoxy-5-benzofuraldehyde in 200 parts of methanol was added a solution of 35 parts of potassium hydroxide in 180 parts of water. After warming for a few minutes, a test portion gave a clear solution upon dilution with a large volume of water. Five hundred (500) parts of water was added and the methanol was distilled under reduced pressure. The resulting clear solution was acidified with hydrochloric acid and the 2-carboxy-5-benzofuraldehyde was collected, washed with water, and air dried. Crystallization from aqueous dioxane gave colorless crystals that did not melt below 260° C.

Analysis.—Calc'd. for $C_{10}H_6O_4$: C, 63.16; H, 3.18. Found: C, 63.17; H, 3.34.

D. *2 - (o - hydroxyphenylcarbamyl) - 5 - benzofuraldehyde.*—A suspension of 38 parts of 2-carboxy-5-benzofuraldehyde in 150 parts of chloroform and 30 parts of thionyl chloride were refluxed until a homogeneous solution was obtained. The chloroform and excess thionyl chloride were removed under reduced pressure and the solid 2-chloroformyl-5-benzofuraldehyde was dissolved in 50 parts of dioxane. The dioxane solution of the acid chloride was added to a suspension of 45 parts of o-aminophenol in 200 parts of ether. The crude reaction product was collected, washed with dilute hydrochloric acid, dilute sodium bicarbonate solution, and then with water. After air-drying, the 2-(o-hydroxyphenylcarbamyl)-5-benzofuraldehyde was crystallized several times from acetone. The compound melts at 219–220° C. and has the formula

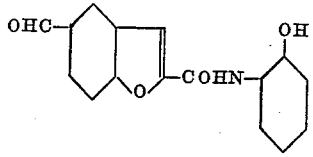

Analysis.—Calc'd. for $C_{16}H_{11}O_4N$: C, 68.30; H, 3.95; N, 4.98. Found: C, 68.53; H, 4.35; N, 5.22.

E. *2 - (o - hydroxyphenylcarbamyl) - 5 - benzofuraldehyde polyvinyl acetal.*—A suspension of 1.3 parts of 2-(o-hydroxyphenylcarbamyl)-5-benzofuraldehyde in 40 parts of ethylene glycol and 0.4 part of 92% phosphoric acid was stirred at 100° C. until a homogeneous solution was obtained. The solution was cooled to 65° C. and a mixture of 5 parts of polyvinyl alcohol and 0.1 part of o-sulfobenzaldehyde sodium salt was added. The reaction mixture was stirred at 65° C. for 0.5 hour and the 2 - (o - hydroxyphenylcarbamyl) - 5 - benzofuraldehyde/sodium-o-sulfobenzaldehyde polyvinyl mixed acetal was isolated essentially as described in Example I, Section I.

F. *Photographic emulsion using 2-(o-hydroxyphenylcarbamyl)-5-benzofuraldehyde polyvinyl mixed acetal.*—One hundred (100) parts of a 5% solution of 2-(o-hydroxyphenylcarbamyl) - 5 - benzofuraldehyde/sodium - o-sulfobenzaldehyde polyvinyl mixed acetal was prepared essentially as described in Example I, Section J. A silver halide emulsion using this solution was prepared, coagulated, washed, redispersed, and coated on film base essentially as described in Example I, Section J. The processed film gave a strong cyan negative dye image.

*Example X*

A. *2 - carboxy - 8(7) - dibenzofuranecarboxaldehyde.*—2-carbomethoxy-8(7)-dibenzofuranecarboxaldehyde,

was prepared from dibenzofuran as follows: dibenzofuran→2 - acetyldibenzofurane→dibenzofuran - 2 - carboxylic acid→methyl dibenzofuran - 2 - carboxlate→methyl 8(7)-chloromethyldibenzofuran-2-carboxylate→2-carbomethoxy-8(7)-dibenzofuranecarboxaldehyde essentially as described in Example I for the preparation of p-(p-carbomethoxyphenoxy)benzaldehyde. A mixture of 80 parts of 2-carbomethoxy-8(7)-dibenzofuranecarboxaldehyde, 300 parts of ethanol and 36 parts of potassium hydroxide in 100 cc. of water was warmed for several minutes. Sufficient water was added to redissolve the potassium salt of the 2-carboxy-8(7)-dibenzofuranecarboxaldehyde, the ethanol was removed under reduced pressure and the solution was acidified with hydrochloric acid. The 2-carboxy-8(7)-dibenzofuranecarboxaldehyde was collected, washed thoroughly with water and dried. The compound is sparingly soluble in all solvents and does not melt below 250° C. The position of the aldehyde group was not determined.

Analysis.—Calc'd. for $C_{14}H_8O_4$: C, 69.97; H, 3.36. Found: C, 69.81; H, 3.50.

B. *2-(o-hydroxyphenylcarbamyl)-8(7)-dibenzofuranecarboxaldehyde.*—A suspension of 24 parts of 2-carboxy-8(7)-dibenzofuranecarboxaldehyde in 300 parts of chloroform and 25 parts of thionyl chloride was refluxed until a homogeneous solution was obtained. The chloroform and excess thionyl chloride were removed under reduced pressure. The solid acid chloride was dissolved in dioxane and added to a suspension of 24 parts of o-aminophenol in 200 parts of ether. The reaction mixture was diluted with water. The solid material was collected, washed with water and crystallized several times from aqueous acetone. The 8(7)-(o-hydroxyphenylcarbamyl)-2-dibenzofuranecarboxaldehyde thus obtained melted at 205–207° C. It has the formula:

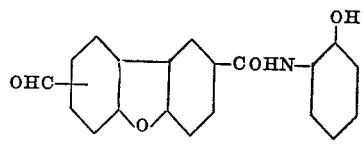

Analysis.—Calc'd. for $C_{20}H_{13}O_4N$: N, 4.23. Found: N, 3.87.

C. *2-(o-hydroxyphenylcarbamyl)-8(7)-dibenzofuranecarboxaldehyde polyvinyl mixed acetal.*—A suspension of 1.2 parts of 2-(o-hydroxyphenylcarbamyl)-8(7)-dibenzofuranecarboxaldehyde in 40 parts of ethylene glycol and 0.4 part of 92% phosphoric acid was stirred at 100° C. until a homogeneous solution was obtained.

The solution was cooled to 65° C. and a mixture of 5 parts of polyvinyl alcohol and 0.1 part of o-sulfobenzaldehyde sodium salt was added. The reaction mixture was stirred at 65° C. for 0.5 hour and the 2-(o-hydroxyphenylcarbamyl)-8(7)-dibenzofuranecarboxaldehyde/sodium-o-sulfobenzaldehyde polyvinyl mixed acetal was isolated essentially as described in Example I, Section I.

D. *Photographic emulsion using 2-(o-hydroxyphenylcarbamyl)-8(7)-dibenzofuranecarboxaldehyde polyvinyl mixed acetal.*—One hundred (100) parts of a 5% solution of 2-(o-hydroxyphenylcarbamyl) - 8(7) - dibenzofuranecarboxaldehyde/sodium - o - sulfobenzaldehyde polyvinyl mixed acetal was prepared essentially as described in Example I, Section J. A silver halide emulsion was prepared with this solution, coagulated, washed, redispersed and coated on film base essentially as described in Example I, Section J. The processed film gave a strong cyan negative dye image.

A number of specific N-(hydroxyphenyl)carbamyl aldehydes have been described in the foregoing examples. Other compounds of this invention which can be prepared in like manner and converted to monomeric and polyvinyl acetals include:

5-(o-hydroxyphenylcarbamyl)-2-ethoxybenzaldehyde,

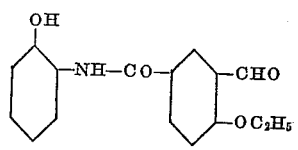

5-(o-hydroxyphenylcarbamyl)-2-ethylbenzaldehyde,

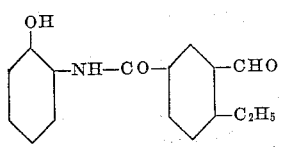

5-(o-hydroxyphenylcarbamyl)-3-carbomethoxybenzaldehyde,

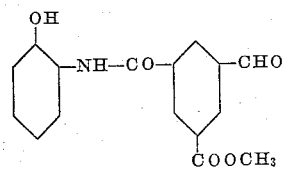

p-[p-(m-methyl-o-hydroxyphenylcarbamyl)-phenoxy]benzaldehyde,

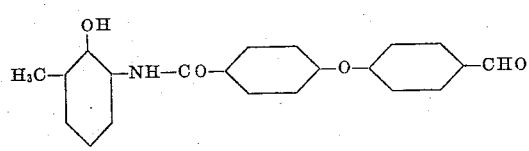

p-(o-phenyl-m-hydroxyphenylcarbamyl)benzaldehyde,

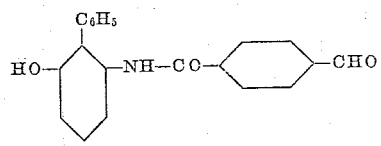

p-[p-(o-hydroxyphenylcarbamyl)phenyl]benzaldehyde,

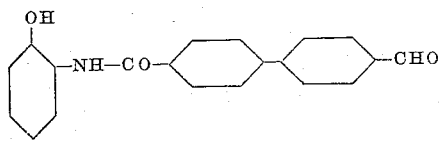

2-(m-ethyl-o-hydroxyphenylcarbamyl)-5-furaldehyde,

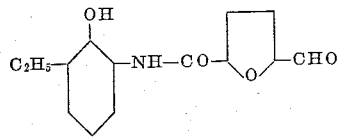

2-(m-chloro-o-hydroxyphenylcarbamyl)-5-thienaldehyde,

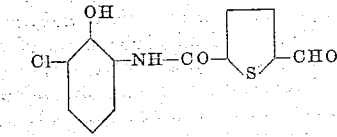

2-(o-hydroxyphenylcarbamyl)-6-naphthaldehyde,

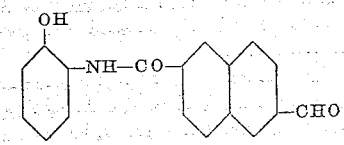

2-(5-chloro-2-hydroxyphenylcarbamyl)-5-thianapthaldehyde,

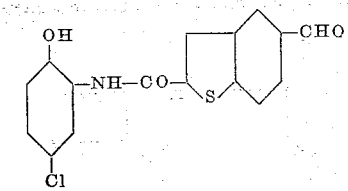

2-(o-hydroxyphenylcarbamyl)-6-quinolyl-aldehyde

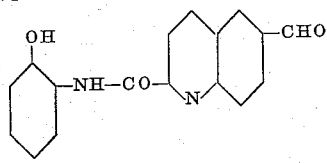

2-(m-hydroxyphenylcarbamyl)-5-pyridylaldehyde,

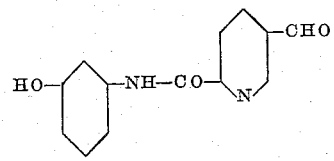

p-[(m-hexyl-o-hydroxyphenyl)methoxy]benzaldehyde,

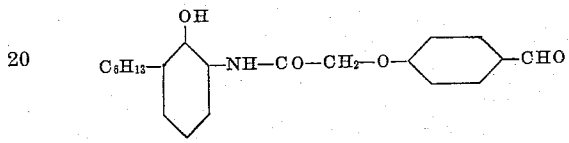

and the like.

The radical R separating the carbamyl carbon from the aldehyde carbon is, broadly speaking, a divalent radical whose terminal valences stem from carbon atoms, at least one of which is a nuclear carbon of an aromatic ring. It may be strictly aromatic, alkylaromatic or heterocyclic-aromatic and it may bear substituents such as halogen, nitro, carbalkoxy and the like which have no substantial reactivity towards alcohols and aldehyde, since the aldehydes are particularly useful in the preparation of acetals. Preferably, the radical R contains from 4 to 12 carbon atoms and has one or two nuclei aromatic in character, i. e., it contains no atoms other than carbon, hydrogen and oxygen, the latter being present in a straight or closed chain ether linkage. Particularly useful, because of their high light stability, are the N-(hydroxyphenyl)carbamyl aldehydes where the radical R contains one or two phenylene nuclei and an open chain ether oxygen, i. e., the phenoxy group,

—O—C$_6$H$_4$— or the diphenyleneoxy group, —C$_6$H$_4$—O—C$_6$H$_4$—.

The hydroxyphenyl nucleus attached to the carbamyl nitrogen bears the hydroxyl group in either the ortho or the meta position with respect to the carbamyl nitrogen, preferably the former. The other one of these two positions can bear substituents such as chlorine, bromine, alkyl of 1 to 6 carbons or aryl, preferably phenyl, and other similar substituents can also be attached to the other nuclear carbons, provided the position para to the hydroxyl group is unsubstituted or substituted with a group replaceable in the coupling reaction, such as chlorine or bromine. Preferably, the hydroxyphenyl group bears no substituents besides the hydroxyl group.

When the aldehydes of this invention are acetalized, as for example for use in photographic color-formers, the alcohol portion of the acetal molecule may be any desired monohydric or polyhydric alcohol. When it is monomeric, it is preferably an alkanol of 1 to 4 carbon atoms or a dihydric or trihydric aliphatic alcohol of 2 to 4 carbon atoms, e. g., ethylene glycol, glycerol, propylene glycol or butylene glycol, and still more preferably an alkanediol of 2 to 4 carbon atoms. When it is polymeric, it may be any completely or partially hydrolyzed polymer of a vinyl carboxylate, particularly a vinyl ester of a monocarboxylic acid of 1 to 4 carbons, e. g., vinyl formate, vinyl acetate, vinyl chloroacetate, vinyl propionate, vinyl butyrate, etc. The vinyl carboxylate should be sufficiently hydrolyzed so that the vinyl alcohol groups —CH$_2$—$\overset{|}{\text{CHOH}}$— represent at least 50% of the polymer chain, i. e., for every 100 chain carbon atoms there are at least 25 hydroxyl groups. Hydrolyzed interpolymers of vinyl esters with minor proportions (10% or less by weight) of other polymerizable vinyl compounds, e. g., vinyl chloride, methyl methacrylate, etc. may be used, especially when a lower degree of water solubility is desired. The above polyvinyl compounds moreover may be partially acetalized with non-color forming aldehydes, e. g. formaldehyde, acetaldehyde, n-butyraldehyde, benzaldehyde, up to a total of about 10% of the

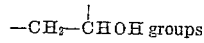groups being so acetalized. In particular, the water-soluble hydrolyzed olefin/vinyl ester interpolymers and especially the hydrolyzed ethylene/vinyl acetate interpolymers described in U. S. Patents 2,386,347 and 2,397,866 are useful. The preferred polyhydric alcohol is polyvinyl alcohol, and in particular the polyvinyl alcohols ranging in viscosity from 5 to 50 centipoises in 4% aqueous solution at 20° C.

In the polyvinyl acetals of this invention, it is preferred that between 0.75% and 10%, and still more preferably between 0.75% and 7.5%, of the hydroxyl groups of the polyvinyl alcohol be acetalized with the N-(hydroxyphenyl)-carbamyl aldehyde. Below 0.75% acetalization, there are insufficient color-forming groups present to give sufficient color strength in a photographic color film. When more than 10% of the hydroxyl groups of the polyvinyl alcohol are acetalized, the permeability of the layer to the various solutions used to process the photographic film becomes too low for practical application. It is to be understood that the polyvinyl acetal contain a large number of free intra linear

—CH₂—CHOH— groups. The polyvinyl acetals falling within the above-defined range are outstanding with respect to top color density, light stability and spectral characteristics in the blue-green range on color development with p-amino-diethylaniline type developers. These polymeric compounds are amorphous, high molecular weight solids which are insoluble in dilute aqueous sodium hydroxide and hot water but are soluble in 10–40% aqueous ethanol.

As illustrated in some of the examples, an advantageous modification of the invention is obtained when acidic salt-forming groups are introduced into the polymeric acetal by reaction of the polyvinyl alcohol or partial polyvinyl acetal with aldehydes containing carboxylic or sulfonic acid groups. In addition to the o-sulfobenzaldehyde of the examples, which is the preferred aldehydo acid, suitable compounds include phthaldehydic acid, glyoxalic acid, and propionaldehyde β-sulfonic acid. Desirably, from 0.1% to 5% of the hydroxyl groups in the polyvinyl alcohol are acetalized with the aldehydo acid. The final compounds need not be used in the form of the free acids as their alkali metal, ammonium and amine salts, and especially the sodium salts, are very effective.

The acetals of this invention may be added to gelatin or other colloid silver halide emulsions as color-formers. The polyvinyl acetals are of special interest since they can be used as the sole binders for light-sensitive silver halides for photographic color films. They are resistant to bacterial putrefaction and to molds and can be stored for longer periods of time under adverse conditions than the conventional gelatin emulsions.

Since the acetals described above generally form blue-green or cyan dye images, they are generally used in the cyan layer of a multilayer film or printing paper where the other differentially sensitized layer yield other subtractive color dye images, e. g. yellow and magenta.

This invention also includes as an important aspect the photographic silver halide emulsions containing the N-(hydroxphenyl) carbamyl aldehyde acetals, together with the conventional ingredients which may be present in such compositions, such as optical sensitizing dyes, general emulsion sensitizers, anti-fogging agents, and the like. In the development of exposed silver halide emulsion layers containing these acetals, any aromatic color-forming developer containing a primary amino group can be used. These compounds are usually employed in the salt form, such as the hydrochloride or the sulfate. Suitable compounds are diethyl-p-phenylenediamine, monomethyl-p-phenylenediamine, dimethyl-p-phenylenediamine, 2-amino-5-diethylaminotoluene and the like. The p-aminophenols and their substitution products may also be used. All of these developers have an unsubstituted primary amino group, which permits their oxidation products to couple with the color-former to form a dye image.

What is claimed is:

1. The acetals of the formula:

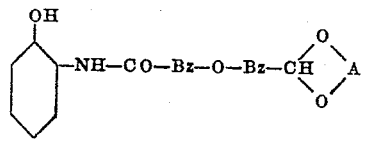

wherein Bz is a benzene nucleus and A is the residue of a polyhydric alcohol, the carbon atoms of the carbon chain of said alcohol that are attached to the oxygen atoms which are attached to the —CH< group being not more than one carbon atom apart in said chain.

2. The compound of the formula:

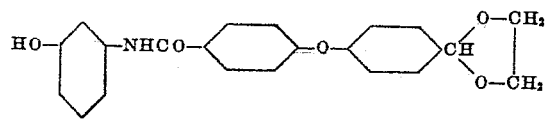

3. The monomeric acetals of the formula:

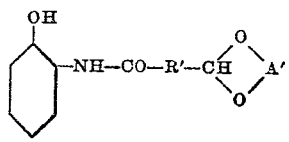

wherein R' is an aromatic hydrocarbon radical and A' is the carbon chain of an alkanediol of 2 to 4 carbon atoms the carbon atoms of which attached to the oxygen atoms are not more than one carbon atom apart in the said chain.

4. Polymeric acetals containing a larger number of recurring intralinear

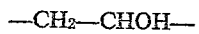 groups and a number of intralinear units of the formula:

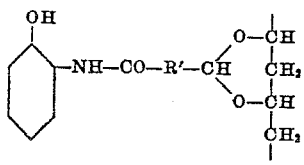

where R' is an aromatic hydrocarbon radical.

5. The acetals of the formula:

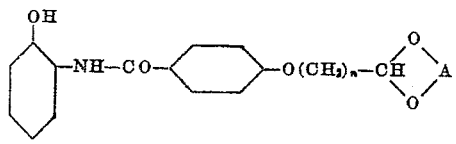

where A is the carbon chain of an aliphatic polyhydric alcohol the carbon atoms of which attached to the oxygen atoms are not more than one carbon atom apart in said chain, and n is an integer from 1 to 6.

6. The acetals of the formula:

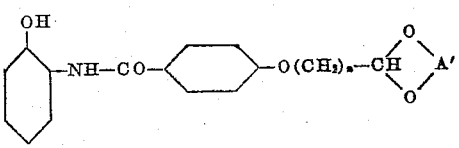

where A' is the carbon chain of an alkanediol of 2 to 4 carbon atoms the carbon atoms of which attached to the oxygen atoms are not more than one carbon atom apart is the said chain, and $n$ is an integer from 1 to 6.

7. The acetal of the formula:

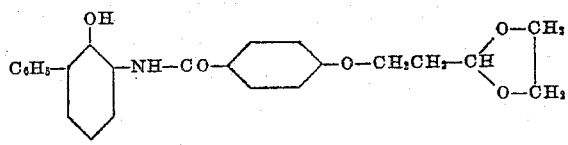

8. The compound of the formula:

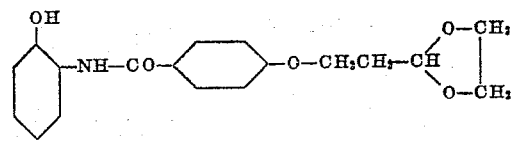

9. Polymeric acetals containing a large number of recurring intralinear

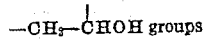 groups and a number of intralinear units of the formula:

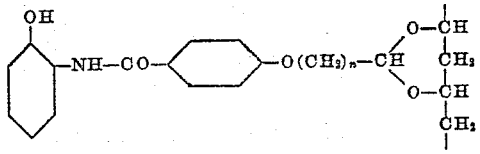

where $n$ is an integer from 1 to 6.

10. The acetals of the formula:

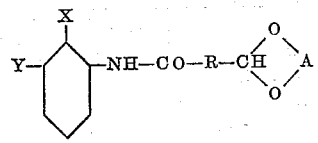

wherein one of the substituents X and Y is a hydroxyl group and the other is a member taken from the group consisting of hydrogen, halogen, alkyl and aryl, the atom attached to the carbon atom in the para position to the hydroxyl radical being taken from the group consisting of hydrogen, chlorine and bromine, and R is a divalent organic radical containing at least one ring, said radical being a cyclic radical having a ring taken from the group consisting of (a) phenylene, naphthylene, biphenyl, diphenyl ether, furane, thiophene, benzofurane, dibenzofurane and benzothiophene, and (b) a radical of the formula

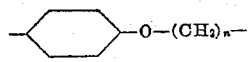

wherein $n$ is an integer from 1 to 6, the free valences of the rings of said radicals that are attached to —CO— and —CH< being on carbon atoms in said rings, said radicals —CO— and —CH< being joined solely through atoms in the rings of members (a), and A is the residue of a polyhydric alcohol, the carbon atoms of the carbon chain of said alcohol that are attached to the oxygen atoms which are attached to the —CH< group being not more than one carbon apart in said chain.

References Cited in the file of this patent
UNITED STATES PATENTS

| | | |
|---|---|---|
| 2,281,703 | Lowe | May 5, 1942 |
| 2,310,943 | Dorough | Feb. 16, 1943 |
| 2,361,936 | Gasper | Nov. 7, 1944 |
| 2,397,864 | Jennings | Apr. 2, 1946 |
| 2,423,730 | Salminen et al. | July 8, 1947 |
| 2,509,874 | McAteer | May 30, 1950 |
| 2,518,704 | Martin | Aug. 15, 1950 |